J. B. WENZEL.
MACHINE FOR MAKING PACKING RINGS.
APPLICATION FILED APR. 22, 1918.

1,322,663.

Patented Nov. 25, 1919.
6 SHEETS—SHEET 2.

INVENTOR:
Jacob B. Wenzel,
BY
Russell M. Everett,
ATTORNEY.

J. B. WENZEL.
MACHINE FOR MAKING PACKING RINGS.
APPLICATION FILED APR. 22, 1918.

1,322,663.

Patented Nov. 25, 1919
6 SHEETS—SHEET 3.

INVENTOR:
Jacob B. Wenzel,
BY
Russell M. Everett,
ATTORNEY.

J. B. WENZEL.
MACHINE FOR MAKING PACKING RINGS.
APPLICATION FILED APR. 22, 1918.

1,322,663.

Patented Nov. 25, 1919.
6 SHEETS—SHEET 4.

INVENTOR:
Jacob B. Wenzel,
BY
Russell M. Everett,
ATTORNEY.

J. B. WENZEL.
MACHINE FOR MAKING PACKING RINGS.
APPLICATION FILED APR. 22, 1918.

1,322,663.

Patented Nov. 25, 1919.
6 SHEETS—SHEET 5.

INVENTOR:
Jacob B. Wenzel,
BY
Russell M. Everett.
ATTORNEY.

J. B. WENZEL.
MACHINE FOR MAKING PACKING RINGS.
APPLICATION FILED APR. 22, 1918.

1,322,663.

Patented Nov. 25, 1919.
6 SHEETS—SHEET 6.

INVENTOR:
Jacob B. Wenzel,
BY
Russell M. Everett,
ATTORNEY.

UNITED STATES PATENT OFFICE.

JACOB B. WENZEL, OF BLOOM, COLORADO.

MACHINE FOR MAKING PACKING-RINGS.

1,322,663.  Specification of Letters Patent.  Patented Nov. 25, 1919.

Application filed April 22, 1918. Serial No. 229,885.

*To all whom it may concern:*

Be it known that I, JACOB B. WENZEL, a subject of Hungary, and a resident of Bloom, in the county of Otero and State of Colorado, have invented new and useful Improvements in Machines for Making Packing-Rings, of which the following is a specification.

This invention relates more particularly to machines for making such packing rings as are hammered upon the edges or opposite plane faces of the ring, as opposed to its inner and outer curved surfaces, although it will be understood that the invention can be utilized for any purpose to which it is adapted.

The objects of the invention are to hammer such rings automatically and enable them to be manufactured rapidly and accurately; to enable the opposite faces to be variably hammered both circumferentially and transversely; to permit the hammering to be adjusted in force or intensity, as desired; to enable an entire ring to be hammered at each revolution or blow of the machine; to distribute the effect of the blows upon the supporting base of the machine; to secure a simple and easily operated machine, which shall not be liable to get out of order, and to obtain other advantages and results as may be brought out in the following description.

Referring to the accompanying drawings, in which like numerals of reference indicate the same parts throughout the several views, Figure 1 is a side elevation of a machine embodying my invention;

In the particular embodiment of the invention shown in said drawings, 1 indicates a suitable frame having feet to be bolted to the floor and raise the machine a convenient distance thereabove. The frame supports a bed plate 2, see Fig. 4, upon which the different parts of the machine are mounted. Briefly, these comprise an anvil plate 3 at one end of the machine upon which the ring to be hammered is laid flatwise, a head 4 in which the hammers are adapted to reciprocate up and down above the ring, and a bracket 5 for the driving means by which motion is imparted to said hammers.

Figure 9:
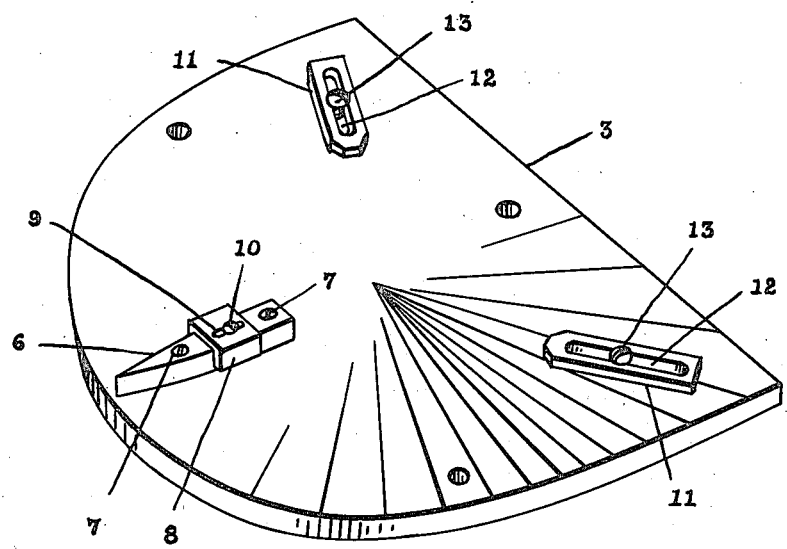
Fig. 9 is a perspective view of the anvil plate, removed.

The anvil plate 3, which is shown in detail in Fig. 9, is preferably slightly conical and is provided with suitable means for positioning ring to be hammered centrally with respect to the hammers above. These means, as shown, comprise a front wedge-shaped spreader 6 fixed to the anvil plate 3 as by screws 7, 7, and having longitudinally adjustable of itself a channel-shaped stop 8 slotted as at 9 to receive a clamping screw 10 by means of which it may be set as desired. It will be understood that in placing a ring on the anvil plate, its split ends are slid rearward on opposite sides of the spreader 6 and seated thereagainst at the rear side or end of the stop 8. This stop can be adjusted for different sizes of rings, and at the rear corners of the anvil plate are other stops 11, 11 slotted as at 12 so as to be adjusted radially of the ring and having set screws 13 for clamping. The ring to be hammered is thus positioned upon the anvil plate by the three stops 8, 11 and 11 properly distributed around its circumference.

Figure 1:
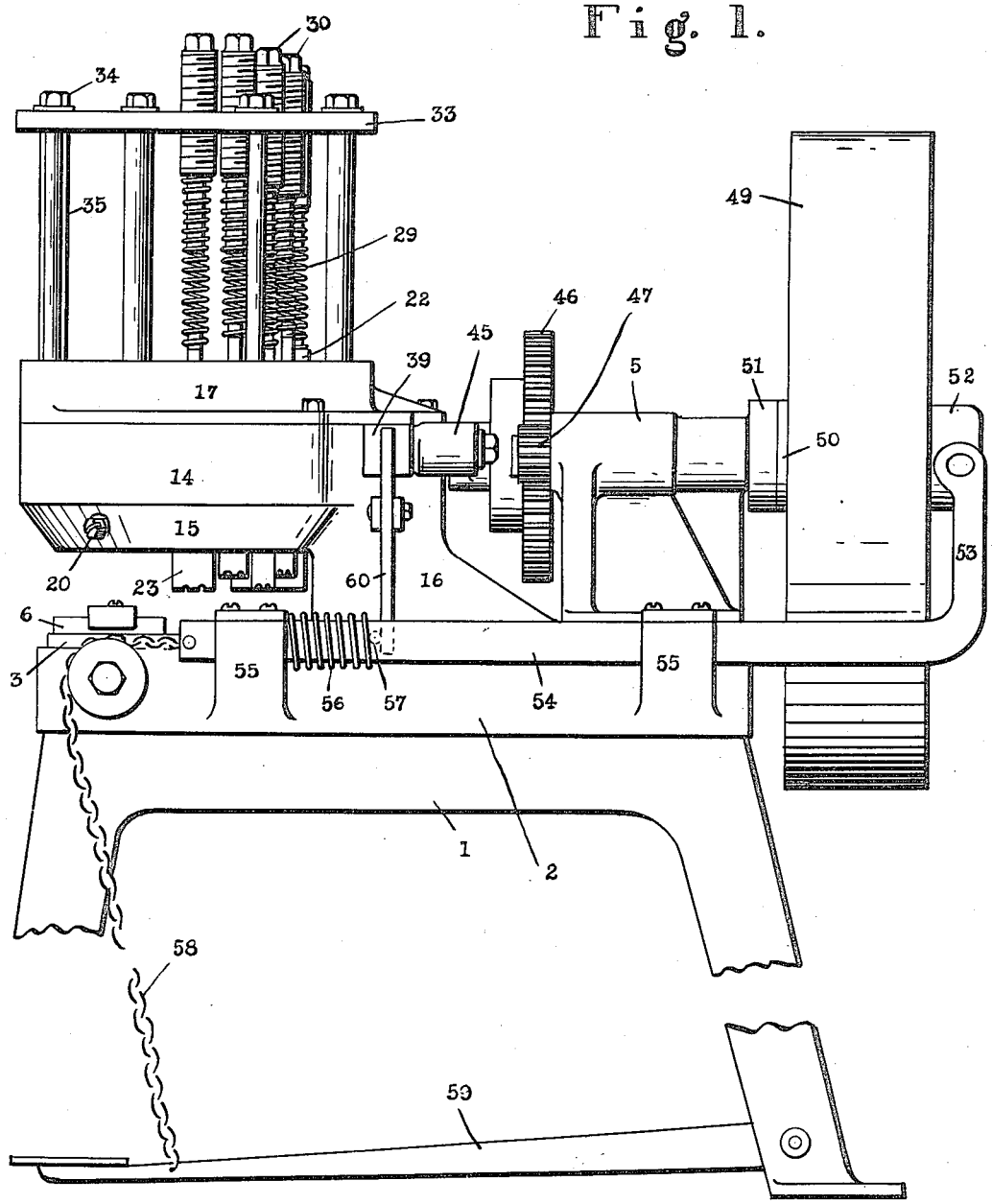
Figure 2:
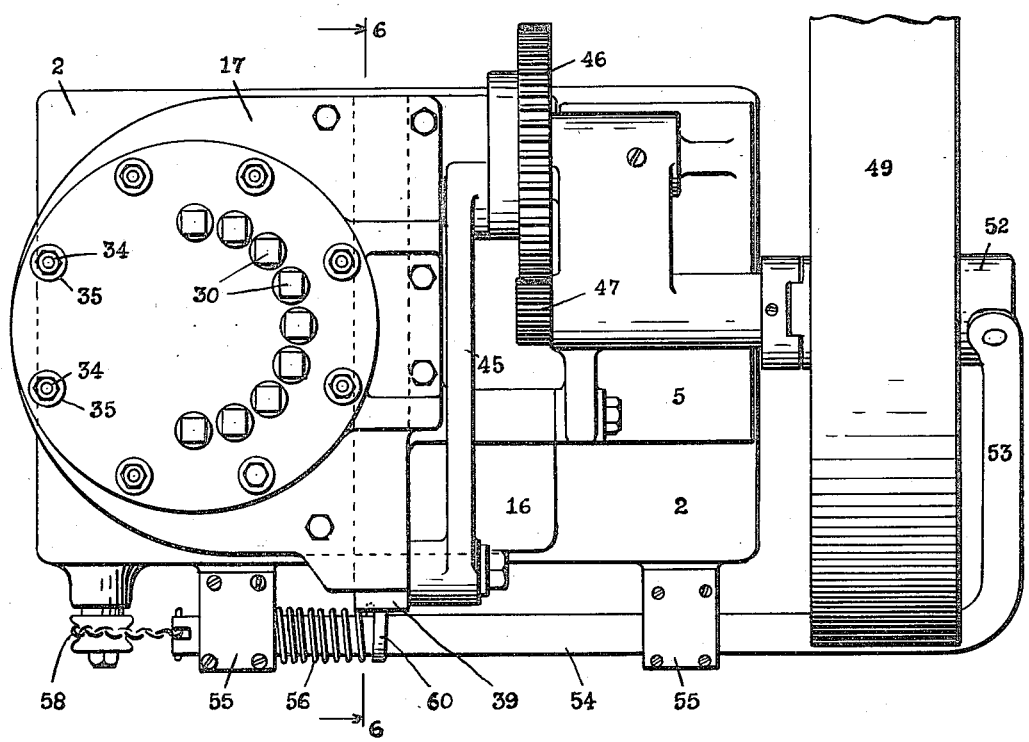
Fig. 2 is a plan of the same.
Figure 3:
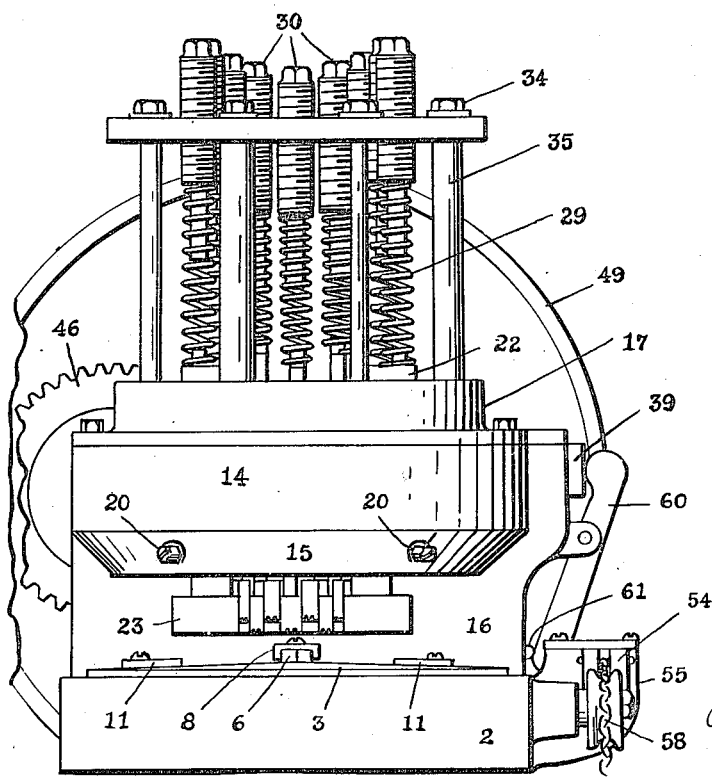
Fig. 3 is an elevation from the front or position occupied by the operator.
Figure 4:
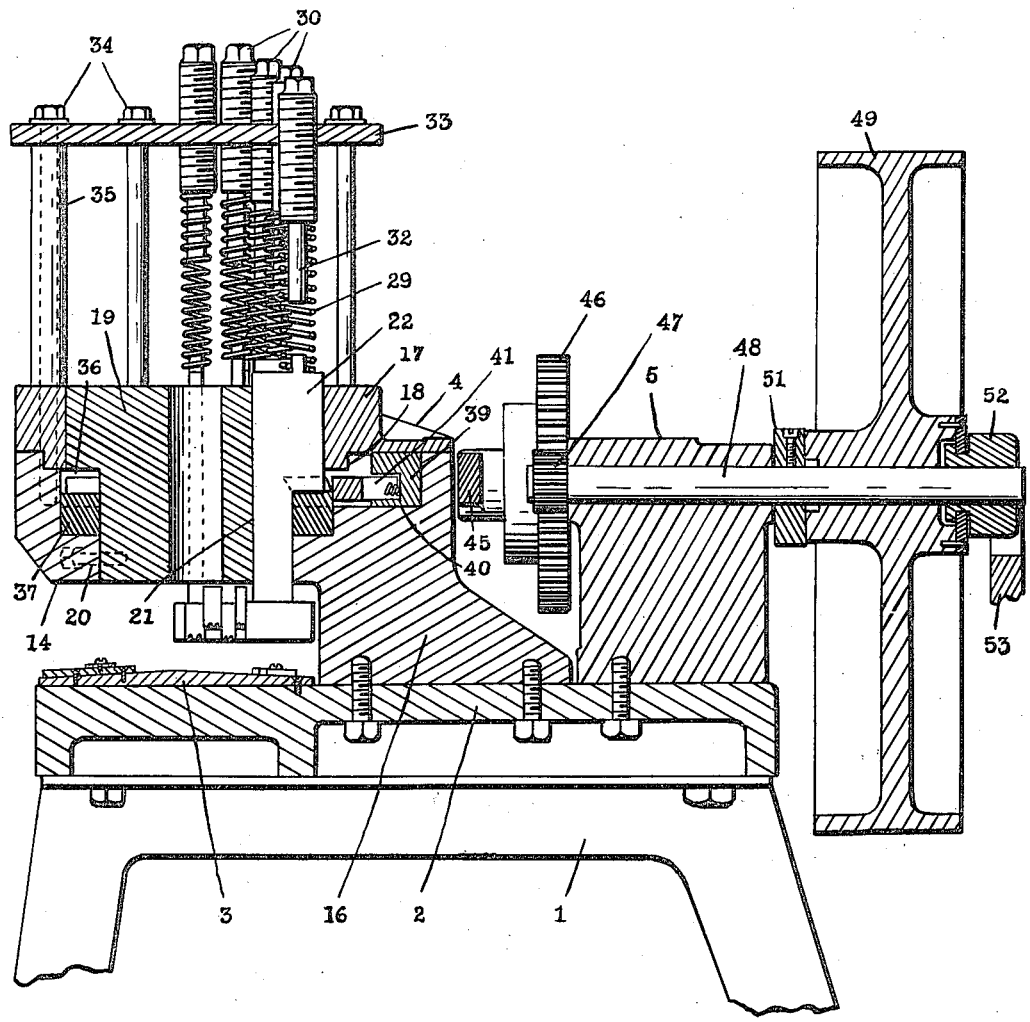
Fig. 4 is a central vertical section from front to rear of the machine.
Figure 8:
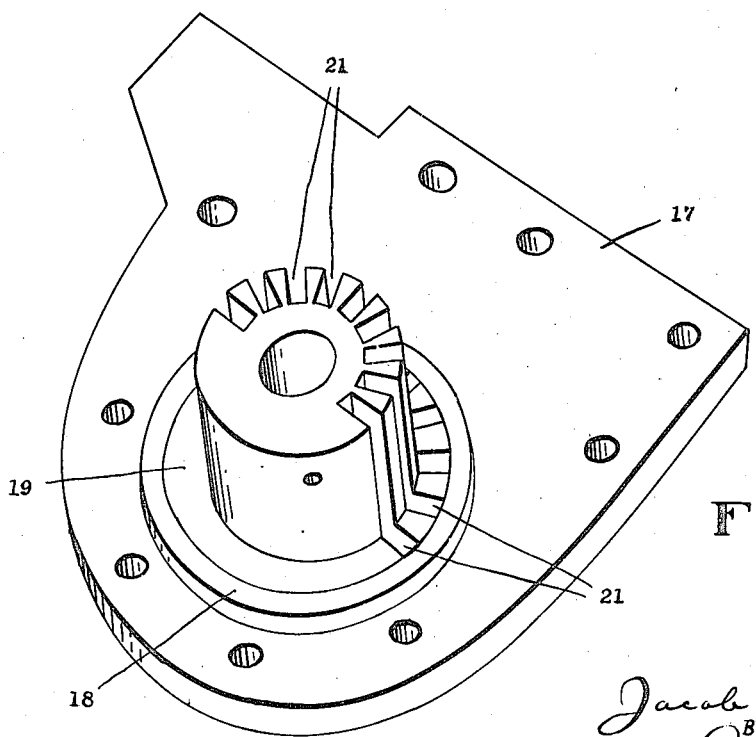
Fig. 8 is a perspective view of the upper part of the head in which the hammers slide, detached and inverted.

The head 4 has a lower part 14 which overhangs the anvil plate, see Figs. 1 and 4, and is preferably beveled at its lower edge 15 to facilitate access to said anvil and the ring thereon; this lower part provides a lateral foot 16 bolted to the bed 2 to support the head, and its overhang has an opening concentric with the anvil 3. The upper part of the head comprises a top plate 17 adapted to be bolted on the lower part of the head, and said top plate has an opening concentric with the said opening of the overhang, a flange 18 around said opening being adapted to seat in a peripheral recess at the top of the overhang opening. Said overhang opening is stepped, or smaller at its lower part than at its upper part, and the opening of the top plate is preferably a little smaller than the upper part of the overhang opening, as shown; a stepped central portion 19 of the head then occupies the said openings, with its upper and lower parts filling them at the top and bottom of the head and terminating substantially flush therewith, and is held by screws 20 extending loosely through the walls of the head and threaded into said central portion. In the outside walls of this central portion 19, see Fig. 8, are radially disposed longitudinal slots 21 affording slideways for hammers 22, which will next be described, one of them being shown in detail in Fig. 10. It will be noted that the central portion 19 is made a separate piece for convenience in forming these slots, and it could be integral if desired.

Figure 10:
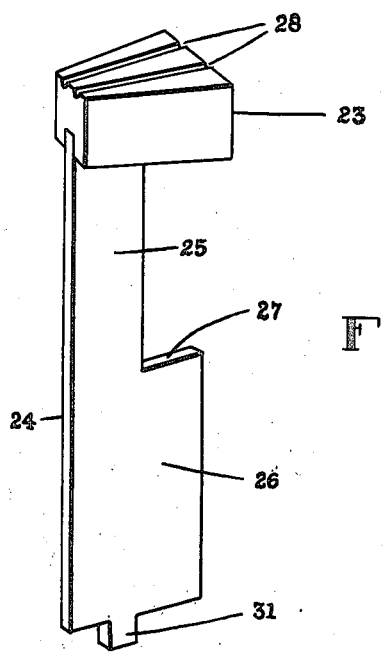
Fig. 10 is a detail perspective view of one of the hammers removed and inverted.

Each hammer comprises a head 23 at its lower end and a flat shank 24 narrow at its lower part 25 and wider at its upper part 26 to fit its slideway, a shoulder 27 thus being formed between the upper and lower parts of the head, as clearly seen in Figs. 4 and 10. I have shown the head of the hammer as somewhat wedge-shaped, so that the series of heads lie closely adjacent to each other and are adapted to hammer substantially the entire surface of the ring, although they can be given any shape desired. I have also shown the face of each hammer grooved transversely of the ring as at 28, but they can be continuous or entire if preferred, and the striking faces can be either flat as shown, slightly rounded or convexed transversely of themselves or circumferentially of the ring. While I have shown a series of hammers 22 extending about half way around the ring, it will be understood that there can be either more hammers or fewer, as desired.

The hammers 22 are normally forced down against a ring on the anvil, and for doing this I have shown helical springs 29, one for each hammer and extending upward therefrom to an adjusting screw 30. The upper end of each hammer has a projection 31 to enter the end of the spring and the lower end of the screw 30 has a projection 32 to enter the other end of the spring, said screw working in a plate 33 held fixed at a suitable distance above the head by bolts 34 and spacing sleeves 35 thereon. Obviously by turning the screws the tension or force delivered on the hammers can be adjusted, and since each hammer preferably has its own spring and screw the force with which it operates may vary from the other hammers and be adjusted independently thereof. In this way I am able to hammer the ring hardest opposite its split and gradually decrease the hammering in both directions therefrom.

Figure 5:
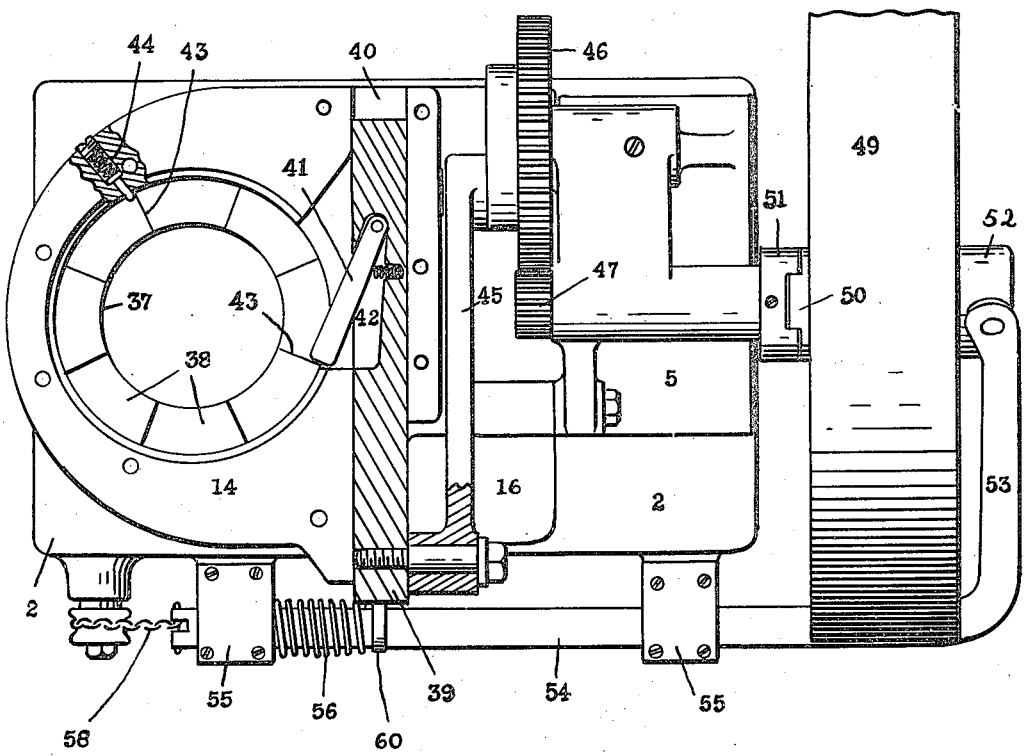
Fig. 5 is a plan of the machine with the upper part of the head in which the hammers slide removed, together with the hammers, and with certain of the other parts in section to show more clearly the construction for operating a certain annular cam.
Figure 7:
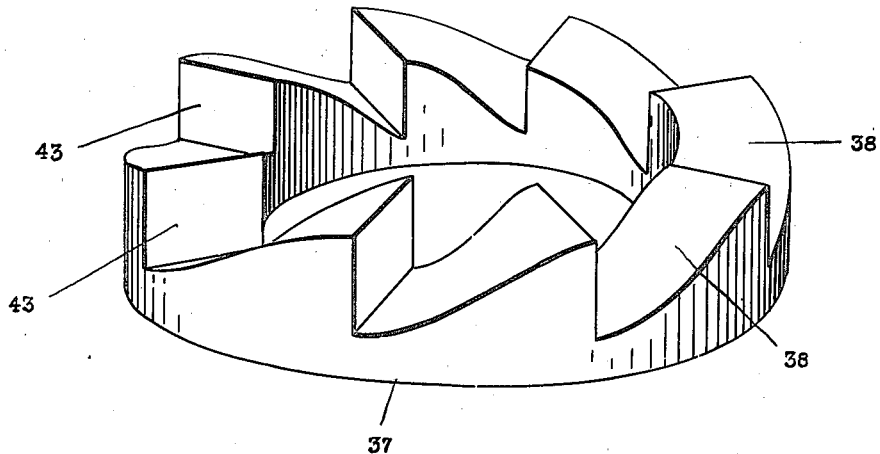
Fig. 7 is a perspective view of the annular cam.

To operate the machine I provide means for holding the hammers raised to enable a ring to be inserted, releasing them to strike their blows, and again raising them to permit the ring to be removed. To this end, an annular recess or chamber 36 is formed in between the stepped lower part 14 and stepped central portion 17, see Fig. 4, and in this recess is placed an annular cam 37, see Figs. 5 and 7, which is adapted when rotated to raise the hammers by engagement beneath their shoulders 27 and then allow them to drop. Preferably the annular cam 37 presents a series of cam surfaces 38 each of which is adapted to have two hammers resting upon it at the same time, but obviously this could be varied as found desirable. By the construction shown, first half of all the hammers are released and then the other half, so that the jar or vibration of having them all strike at once is avoided and yet they all strike in such close sequence that no time is lost.

Any suitable means may be utilized to turn the cam 37, but I have shown a slide 39 adapted to reciprocate horizontally in, or nearly in, the plane of the cam and tangentially adjacent thereto, as in a slideway 40 formed between the upper and lower parts of the head 4, and at the rear thereof. This slide has a pawl 41 pivoted upon itself and normally swung laterally outward by a spring 42 to overlie at its extremity the lowest part of a cam surface 38 and abut against the wall 43 which extends upward to the high point of the next cam surface. Thus as the slide makes its working stroke the cam is turned enough to release the hammer, and on its idle stroke the pawl 41 is closed against its spring 42 by engagement with the peripheral wall of the cam. To prevent such engagement dragging the cam out of position, a spring detent 44 is provided at a suitable peripheral point, see Fig. 5, working radially inward through the wall of the lower part of the head, to lock behind a shoulder 43 of the cam while the slide makes its backward stroke.

Figure 6:
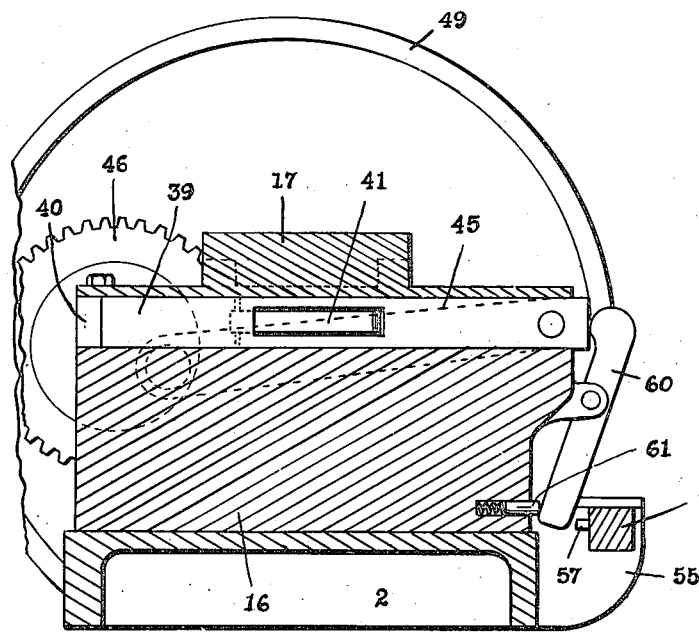
Fig. 6 is a vertical section on line 6—6, Fig. 2, looking in the direction indicated by the arrows.

I have shown the slide 39 reciprocated by means of a pitman 45 pivoted eccentrically to a gear wheel 46 mounted on a stub shaft in the bearing bracket 5 and driven by a pinion 47 on a driving shaft 48 also journaled therein. Said driving shaft has on its outer end a pulley 49 carrying a clutch member 50 adapted to engage a clutch member 51 on the shaft, and means is provided for sliding said pulley to throw the clutch in and out. Preferably the clutch is thrown in by the operator, when a ring has been placed in the machine, and is thrown out automatically at the end of the stroke. The means shown for doing this comprise a collar 52 on the shaft 48 adjacent the driving pulley and connected thereto so as to move with it longitudinally of the shaft and yet rotate independently, said collar being connected to the arm 53 of a rod 54 slidably arranged in guideways 55, 55 at the side of the machine, preferably on the base plate 2. A spring 56, which I have shown on said rod between one of the guideways and a stop pin 57, normally throws the clutch out, but a flexible connection 58 extending from the forward end of the rod 54 to a treadle 59 enables the operator to throw in the clutch when he is ready. The slide 39 then starts upon its idle stroke, from the position shown in Figs. 5 and 6, and in doing this releases a lever 60 pivoted upon the side of the machine so that it is immediately swung by a spring plunger 61 into the path of the stop pin 57 and thus holds the clutch slide rod 54 against movement to release the clutch. As the slide 39 completes its reciprocation and comes back to its initial position it engages the upper end of the lever 60 and throws its lower end away from the slide rod 54, as shown in Fig. 6, so that the spring 56 on the slide rod immediately actuates it to throw out the clutch.

At every revolution of the driving pulley 49, therefore, the annular cam 37 is advanced a tooth and all of the hammers thus tripped, so that the ring on the anvil is hammered. Rings can therefore be hammered with great rapidity, and furthermore they can be hammered with great accuracy in any one of many different ways, by adjusting the machine as described.

Preferably some of the bolts 34 holding the plate 33 for the spring-adjusting screws 30 extend down through the top plate 17 and into the lower part 14 of the head, to secure greater firmness and solidity.

Obviously detail modifications and changes may be made in manufacturing my improved ring without departing from the spirit and scope of the invention, and I do not wish to be understood as limiting myself except as required by the following claims when construed in the light of the prior art.

Having thus described the invention, what I claim is,

1. In a machine of the character described, the combination of means for supporting a ring upon one of its sides, an arcuate series of hammers at the other side of said ring, and means for causing said hammers to strike said other side of the ring.

2. In a machine of the character described, the combination of means for supporting a ring, a series of hammers, and means for actuating said hammers with varying force against a side of the ring perpendicular to its axis.

3. In a machine of the character described, the combination of means for supporting a ring, a hammer at one side of the plane of said ring, and means for actuating said hammer in a direction parallel to the axis of the ring against the side of the ring.

4. In a machine of the character described, the combination of means for supporting a ring, a hammer, and means for causing said hammer to strike the side of the ring.

5. In a machine of the character described, the combination of an anvil for supporting a ring, a hammer with its face inclined transversely of the ring with respect to said anvil, and means for causing said hammer to strike the ring.

6. In a machine of the character described, the combination of an anvil for supporting a piston ring on its side, a head overhanging said anvil, an arcuate series of spring-actuated hammers mounted in said head and having each a shoulder intermediate its ends, an annular cam rotatably mounted in said head engaging said shoulders, and means for actuating said cam.

7. In a machine of the character described, the combination of an inclined anvil for supporting a ring on its side, a hammer for striking said ring on said anvil, and means for actuating said hammer.

8. In a machine of the character described, the combination of an inclined anvil for supporting a ring on its side, a hammer having a striking face inclined transversely of the ring in an opposite direction from the anvil, and means for actuating said hammer.

9. In a machine of the character described, the combination of an anvil for supporting a piston ring on its side, a head overhanging said anvil and providing a removable central portion, a series of hammers held slidably between said central portion and head, a cam for actuating said hammers, and means for operating said cam.

10. In a machine of the character described, the combination of an anvil for supporting a piston ring on its side, a head overhanging said anvil and providing a removable stepped central portion with a series of longitudinal slideways in its outer surface, said head providing an annular chamber beneath the step of said central portion, spring hammers in said slideways, an annular cam in said chamber, and means for rotating said cam to retract and release the hammers.

11. In a machine of the character described, the combination of an anvil for supporting a piston ring on its side, a head overhanging said anvil and having upper and lower portions with central apertures, the aperture in the lower portion being stepped, a movable stepped central portion for said head having a series of longitudinal slideways in its outer surface, spring hammers in said slideways having shoulders exposed beneath the step of said central portion, an annular cam between the upper and lower portions of the head adapted to engage the shoulders of said hammers, and means for rotating said cam to retract and release the hammers.

12. In a machine of the character described, the combination of means for supporting a ring, a series of hammers adapted to strike said ring, and an annulus having a plurality of cam faces for actuating said hammers.

13. In a machine of the character described, the combination of means for supporting a ring, an annular series of hammers adapted to strike one of the sides of said ring, and an annular cam for actuating said hammers in the direction of the axis.

14. In a machine of the character described, the combination of means for supporting a ring, an arcuate series of parallel hammers adapted to strike said ring, and means for actuating said hammers.

15. In a machine of the character described, the combination of means for supporting a ring, a series of hammers, means normally striking said hammers against the side of the ring, an annular cam for actuating said hammers, and means for imparting to said cam a step-by-step motion.

16. In a machine of the character described, the combination of means for supporting a ring, a series of hammers, means normally striking said hammers against the side of said ring, and means for raising and tripping different portions of said hammers at different times.

17. In a machine of the character described, the combination of means for supporting a ring, a series of hammers, means normally striking said hammers against the side of the ring, a cam for tripping said hammers, and means for actuating said cam and also stopping the machine after the hammers have struck once.

18. In a machine of the character described, an arcuate series of parallel hammers having striking faces at one end, means normally striking said hammers against a ring, an annular cam around said hammers intermediate their ends adapted to trip the same, and means for operating said cam.

19. In a machine of the character described, a series of parallel hammers having striking faces at one end and shoulders intermediate their ends, means at the other end of said hammers for normally striking them against a ring, an annular cam around said hammers adapted to engage said shoulders, and means for operating said cam.

20. In a machine of the character described, a series of hammers, an annular cam having a series of inclined surfaces for actuating said hammers, a slide, a pawl on said slide adapted to engage said cam, and means for reciprocating said slide.

21. In a machine of the character described, the combination with an arcuate series of spring hammers, of an annular cam for retracting and releasing the hammers, a slide substantially tangent to said cam and having a spring pawl adapted to engage the same, and means for reciprocating said slide.

22. In a machine of the character described, the combination of a series of spring hammers and an annular cam having a plurality of inclined faces adapted to retract and release the hammers, of a slide adjacent said cam in substantially the same plane therewith, a spring pawl normally projecting over the low portion of each inclined face to engage the high end of the next face, and means for reciprocating said slide, said pawl on the backward stroke of the slide being pushed out of engagement with the cam by the high end of the cam face.

JACOB B. WENZEL.